(12) United States Patent
Hegels et al.

(10) Patent No.: US 12,368,959 B2
(45) Date of Patent: Jul. 22, 2025

(54) OPTICAL ZOOM SYSTEM AND CAMERA FOR A MOBILE DEVICE

(71) Applicant: Huawei Technologies Co., Ltd., Shenzhen (CN)

(72) Inventors: Ernst Hegels, Munich (DE); Volker Gäbler, Berlin (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 573 days.

(21) Appl. No.: 17/532,162

(22) Filed: Nov. 22, 2021

(65) Prior Publication Data

US 2022/0086353 A1    Mar. 17, 2022

Related U.S. Application Data

(63) Continuation of application No. PCT/EP2019/063347, filed on May 23, 2019.

(51) Int. Cl.
*H04N 23/69* (2023.01)
*G02B 7/09* (2021.01)
(Continued)

(52) U.S. Cl.
CPC .............. *H04N 23/69* (2023.01); *G02B 7/09* (2013.01); *G02B 7/10* (2013.01); *G02B 15/143105* (2019.08); *G02B 15/163* (2013.01); *G02B 27/646* (2013.01); *G03B 5/00* (2013.01); *G03B 13/36* (2013.01); *H04M 1/0202* (2013.01);
(Continued)

(58) Field of Classification Search
CPC ........ H04N 23/69; H04N 23/45; H04N 23/67; H04N 23/687; G02B 7/09; G02B 7/10; G02B 15/143105; G02B 15/163; G02B 27/646; G02B 27/1013; G02B 27/149; G02B 15/144105; G02B 15/145113;
(Continued)

(56) References Cited

U.S. PATENT DOCUMENTS 3,848,967 A  * 11/1974  Grey ................... G02B 15/177
                                                              359/677
7,474,844 B2 *  1/2009  Kokabu .................. H04N 23/69
                                                              348/240.99
(Continued)

FOREIGN PATENT DOCUMENTS

CN         101833162 A       9/2010
CN         103782583 A       5/2014
(Continued)

OTHER PUBLICATIONS

Kingslake, R., "The Development of the Zoom Lens," Journal of the SMPTE, vol. 69, No. 8, Aug. 1960, 11 pages.

*Primary Examiner* — Pritham D Prabhakher
(74) *Attorney, Agent, or Firm* — Conley Rose, P.C.

(57) ABSTRACT

An optical zoom camera and an optical zoom system for the optical zoom camera. The optical zoom system comprises at least three spatially separated lens groups, which are arranged on an optical axis. The optical zoom system does not include any further lens groups on the optical axis. A third lens group is immovable along the optical axis, a second lens group is movable along the optical axis to set a magnification of the optical zoom system, and a first lens group is movable along the optical axis to focus the optical zoom system.

20 Claims, 6 Drawing Sheets

(51) Int. Cl.
*G02B 7/10* (2021.01)
*G02B 15/14* (2006.01)
*G02B 15/163* (2006.01)
*G02B 27/64* (2006.01)
*G03B 5/00* (2021.01)
*G03B 13/36* (2021.01)
*H04M 1/02* (2006.01)
*H04N 23/45* (2023.01)
*H04N 23/67* (2023.01)
*H04N 23/68* (2023.01)

(52) U.S. Cl.
CPC ............ *H04N 23/45* (2023.01); *H04N 23/67* (2023.01); *H04N 23/687* (2023.01); *G03B 2205/0007* (2013.01); *G03B 2205/0046* (2013.01); *H04M 2250/52* (2013.01)

(58) Field of Classification Search
CPC .. G03B 5/00; G03B 13/36; G03B 2205/0007; G03B 2205/0046; H04M 1/0202; H04M 2250/52
USPC ..................................... 348/208.11
See application file for complete search history.

(56) References Cited

U.S. PATENT DOCUMENTS

| | | | | |
|---|---|---|---|---|
| 7,746,564 B2* | 6/2010 | Miyamoto | ............ | H04N 23/55 |
| | | | | 359/826 |
| 9,294,658 B2* | 3/2016 | Adachi | ................... | G03B 3/10 |
| 9,674,417 B2* | 6/2017 | Kim | ......................... | G03B 9/06 |
| 10,139,601 B2 | 11/2018 | Choi et al. | | |
| 2005/0231817 A1 | 10/2005 | Matsusaka et al. | | |
| 2006/0001759 A1* | 1/2006 | Raschke | ................ | G03B 17/04 |
| | | | | 348/335 |
| 2006/0127076 A1* | 6/2006 | Kokabu | ................. | G02B 7/102 |
| | | | | 348/E5.045 |
| 2008/0316624 A1* | 12/2008 | Miyamoto | ............ | G03B 17/17 |
| | | | | 359/823 |
| 2009/0303612 A1 | 12/2009 | Fukuta et al. | | |
| 2010/0231781 A1 | 9/2010 | Lee | | |
| 2013/0050568 A1* | 2/2013 | Adachi | .................... | G03B 3/10 |
| | | | | 359/698 |
| 2013/0063629 A1* | 3/2013 | Webster | ............... | G02B 27/149 |
| | | | | 348/265 |
| 2014/0267844 A1* | 9/2014 | Iwata | ................... | G02B 27/646 |
| | | | | 348/265 |
| 2015/0109485 A1* | 4/2015 | Ozaki | ................. | G02B 27/646 |
| | | | | 359/557 |
| 2016/0044232 A1* | 2/2016 | Kim | ....................... | H04N 23/69 |
| | | | | 348/345 |
| 2017/0115472 A1 | 4/2017 | Obama et al. | | |
| 2017/0176727 A1* | 6/2017 | Uehara | ................. | G02B 15/20 |
| 2017/0219913 A1 | 8/2017 | Ito et al. | | |
| 2018/0367714 A1* | 12/2018 | Im | ........................ | H04N 23/687 |

FOREIGN PATENT DOCUMENTS

| | | |
|---|---|---|
| CN | 106662724 A | 5/2017 |
| CN | 107024755 A | 8/2017 |
| GB | 2501817 A | 11/2013 |
| WO | 2013036648 A1 | 3/2013 |

* cited by examiner

OPTICAL ZOOM SYSTEM AND CAMERA FOR A MOBILE DEVICE

CROSS REFERENCE TO RELATED APPLICATIONS

This is a continuation of International Patent Application No. PCT/EP2019/063347 filed on May 23, 2019, which is hereby incorporated by reference in its entirety.

TECHNICAL FIELD

The present disclosure relates to the field of cameras for mobile devices, in particular optical zoom cameras. The disclosure proposes an optical zoom system for such an optical zoom camera and the optical zoom camera, which are suitable for modern mobile devices, for instance, smartphones.

BACKGROUND

Recently there has been a tendency to supply imaging devices in mobile devices, e.g. mobile phones, with two or even three different fixed focal length cameras, in order to record still or moving pictures with different image magnifications. For each magnification, a dedicated camera is provided. Since, however, the available volume in mobile phones is limited, the number of cameras is limited, too.

Moreover, especially for imaging with tele-photo magnification, it is difficult to implement the cameras inside a thin housing of e.g. a smartphone. Until now, only magnifications of up to M2× and M3× have been demonstrated to be compatible with modern mobile device thicknesses.

An alternative to the above-mentioned fixed focal length cameras would be optical zoom cameras. Optical zoom cameras for mobile devices are typically folded, using mirrors or prisms, so that the optical zoom system (zoom optics) can extend along the longest dimension of the mobile device (e.g. smartphone). However, up to now, such folded optical zoom cameras use a lens concept that makes them rather bulky, and it may be impossible to implement them in thinner future smartphones. One example of a mobile phone with a folded optical zoom camera is the ASUS ZenPhone, which requires an extra thick middle section.

The optical zoom systems usually involve movements of all their lens groups, to simultaneously shift the optics over a large mechanical range, in order to form an image on an image sensor. These movements involve shifting of all variable lenses at all times, so as to keep the image plane stable. This results in long and bulky optics. Further, it imposes significant restraints and tight tolerances on actuator movement that drives the lenses or lens groups, in order to achieve a precise simultaneous positioning.

Because of the above-described lack of compatibility with modern mobile devices, particularly smartphones, the implementation of tele-photo optical zoom systems has been abandoned.

SUMMARY

In view of the above, embodiments of the present disclosure aim at providing improved optical zoom cameras for mobile device. An objective is to provide an optical zoom system for an optical zoom camera that is compatible with modern mobile device, particularly smartphone, thickness. The optical zoom system should accordingly allow making the optical zoom camera, and by consequence the mobile device, less bulky, in particular thinner. Another goal is to provide a tele-photo optical zoom camera with an optical zoom that is precise over a long tele-photo range.

The objective is achieved by the embodiments of the disclosure as described in the enclosed independent claims. Advantageous implementations of the embodiments of the disclosure are further defined in the dependent claims.

In particular, embodiments of the disclosure propose a new optical zoom system design for an optical zoom camera compatible with modern smartphones.

A first aspect of the disclosure provides an optical zoom system for a mobile device, the optical zoom system comprising at least three spatially separated lens groups arranged on an optical axis, wherein the optical zoom system does not include any further lens groups on the optical axis, wherein a third lens group is immovable along the optical axis, a second lens group is movable along the optical axis to set a magnification of the optical zoom system, and a first lens group is movable along the optical axis to focus the optical zoom system.

The at least three spatially separated lens groups comprise, in particular, all lens groups of the optical zoom system. The optical zoom system of the first aspect benefits from the dedication and separation of the optical zooming function to different lens groups. The resulting optical design of the optical zoom system becomes more compact as a consequence, and thus suitable for an optical zoom camera in a modern mobile device, e.g. smartphone. The optical zoom system may have as few as three lens groups (wherein two of the lens groups are movable, and one lens group is fixed/immovable). A zooming function that sets the magnification of the optical zoom system can be performed with the second lens group, and a zooming function that focuses the optical zoom system can be performed with the first lens group. The third, fixed lens group, can provide the collected light onto an image sensor of an optical zoom camera.

In an embodiment, the second lens group is movable over a greater distance along the optical axis than the first lens group That is, the first lens group may use a larger travel distance, while the second lens group may vary less, e.g. only a little. Since the zooming functions are divided between the first lens group and the second lens group, only one lens group has to be moved at a time. For example, the magnification may be set as intended by moving the second lens group, and then the adjustment for the focusing of the optical system may be made by moving the second lens group. An optical macro function may also be achieved using the first lens group. However, the first lens group and the second lens group may also move simultaneously.

In an implementation form of the first aspect, each lens group, except the first and the second lens group, is immovable along the optical axis.

That means, the first lens group and the second lens group are the only movable lens groups of the optical zoom system. Thus, the lens groups that have to be moved is kept at a minimum.

In an implementation form of the first aspect, the first and/or the second lens group is continuously movable along the optical axis.

Thus, the magnification and/or focus of the optical zoom system can be adjusted precisely.

In an implementation form of the first aspect, each lens group is assigned a separate space in the optical zoom system, which is not used and/or usable by any other lens group.

The optical design of the optical zoom is thus optimized, in that there is no mechanical overlap between e.g. actuator ranges of both movable lens groups.

In an implementation form of the first aspect, the second lens group and the first lens group are separately and/or independently movable.

The optical zoom system can be build more compact and less complex as a consequence.

In an implementation form of the first aspect, the second lens group is movable between the third lens group and the first lens group.

In an implementation form of the first aspect, the optical zoom system further comprises a second actuator configured to move the second lens group, and a first actuator configured to move the first lens group.

That is, the optical zoom system can be controlled, e.g. by a control device of an optical zoom camera or mobile device including the optical zoom system, to move the first lens group and second lens group independently.

In an embodiment, the first actuator is configured to move the second lens group more accurately and/or faster than the second actuator is configured to move the first lens group.

In particular, this is beneficial if the second lens group is movable over a larger spatial range than the first lens group. The second lens group can be moved roughly to set the magnification, and the first lens group can be moved accurately to focus precisely. Since the first lens group may be involved in an autofocus operation, moving the first lens group faster provides high autofocusing speed.

In an implementation form of the first aspect, the first actuator includes a voice coil actuator or a piezoelectric actuator, and/or the second actuator includes a screw actuator.

In an implementation form of the first aspect, each lens group comprises one or more lenses having an elliptical cross section or an i-cut cross section.

Such cross-section optimized lenses or lens groups, or lens barrels, decreases the F-Number of the optical zoom system, thus enables more light to enter the optical zoom system, and thus enables higher modulation transfer function (MTF) values. Low light operation of the zoom camera is enabled.

In an implementation form of the first aspect, the optical zoom system further comprises an optical image stabilization (OIS) system.

The OIS may involve moving one or more of the lens groups perpendicularly to the optical axis. In one embodiment, the OIS system comprises a tiltable mirror, which may also be configured to fold incident light (entering the optical zoom system) towards the at least three lens groups, i.e. onto the optical axis. In an embodiment, the mirror is configured to tilt about two axes.

In an implementation form of the first aspect, the first lens group is arranged before the second lens group, and the second lens group is arranged before the third lens group, with respect to a light capturing direction of the optical zoom system.

The light capturing direction corresponds, in particular, to a propagation direction of light, which is collected by the optical zoom system, i.e. usually parallel to the optical axis.

In an implementation form of the first aspect, the second lens group has a negative optical power, and the first lens group has a positive optical power.

In an implementation form of the first aspect, the third lens group comprises two subgroups arranged on the optical axis, the two subgroups comprising a first subgroup for collecting light from the second lens group, and a second subgroup for forming a real image from the collected light, the first and the second subgroup each having a positive optical power, wherein light rays associated with one image point of the real image are substantially parallel between the first subgroup and the second subgroup.

In particular, "substantially parallel" means within ±4° from a mean direction of these light rays, e.g. the optical axis, particularly ±2° from the mean direction.

A second aspect of the disclosure provides a zoom camera for a mobile device, the zoom camera comprising the optical zoom system according to the first aspect or any of its implementation forms, and one or more image sensors, each image sensor having a sensor surface for capturing an image based on light collected by the optical zoom system.

The optical zoom camera of the second aspect enjoys all advantages described above for the optical zoom system of the first aspect. In particular, the zoom camera can be build smaller, and enables thinner mobile devices, particularly smartphones.

In an implementation form of the second aspect, the zoom camera further comprises a spectral separator configured to separate the light into a plurality of spectral bands, wherein each of the image sensors is configured to capture an image in one of the spectral bands.

In addition to the optical zoom system, this multi sensor image capturing scheme beneficially enhances the light sensitivity of the zoom camera, and enables multi-color or infrared radiation (IR) imaging.

In an implementation form of the second aspect, the zoom camera is configured to move the first lens group in an autofocus mode.

Since the first lens group may move only over a shorter spatial range in the optical zoom system, and may be driven by a fast and precise actuator, the autofocus operation of the zoom camera is quick and accurate.

In summary, the aspects and implementation forms described above achieve a high quality zoom camera that is capable of taking pictures or video content with a variable magnification, while it can be adjusted over a wide telephoto range (up to M10×) and is capable to be implemented into a modern smartphone. The zoom camera benefits from the optical zoom system, which overcomes the necessity to move all lens groups simultaneously, and achieves a much smaller system length. In particular, by dedicating optical zoom functions to different optical parts (lens groups) allows a more compact design. In contrast to other optical zoom systems, only one lens group has to be moved at a time, and no cross-movement is necessary. Furthermore, stability and actuator application are improved, and design space conflicts are avoided, because the available space is used more efficiently.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present disclosure will be explained in the following description of example embodiments in relation to the enclosed drawings.

DETAILED DESCRIPTION OF EMBODIMENTS

Figure 1:
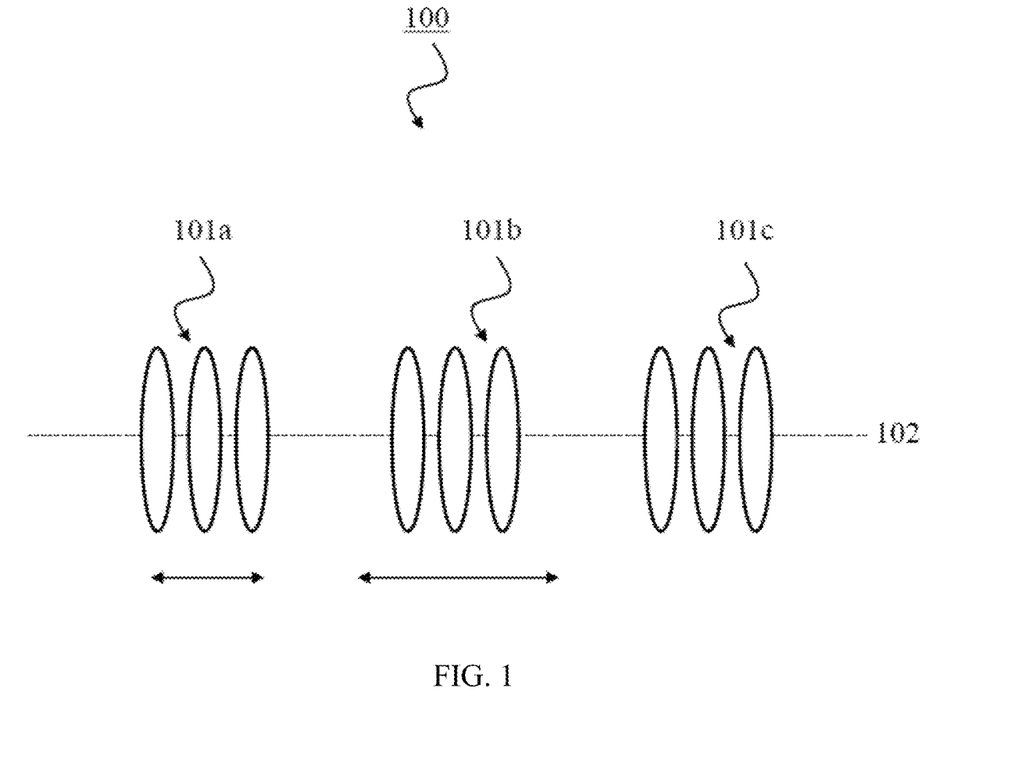
FIG. 1 shows an optical zoom system according to an embodiment of the disclosure.

FIG. 1 shows an optical zoom system 100 according to an example of an embodiment of the disclosure. The optical zoom system 100 is suitable for an optical zoom camera, as e.g. the zoom camera 600 shown in FIG. 6, and is in particular suitable for being used in a mobile device 601, which may be equipped with the zoom camera 600. The optical zoom system 100 beneficially allows building the zoom camera 600 more compact than with previous concepts, and thus also allows designing mobile device 601 thinner in the future. The optical zoom system 100 also enables a higher magnification, i.e. into the longer tele-phot range, than with previous concepts.

The optical zoom system 100 to this end comprises at least three spatially separated lens groups 101, which are arranged on an optical axis 102 (indicated by the dashed line). Notably, the optical zoom system 100 does not include any further lens groups, than the at least three lens groups 101, on the optical axis 102. The optical zoom system 100 may, for example, include exactly three lens groups 101 on the optical axis 102, as exemplarily illustrated in FIG. 1.

Of the at least three lens groups 101 of the optical zoom system 100, at least a third lens group 101c is immovable along the optical axis 102. The optical system 100 may, however, comprise further immovable lens groups 101 on the optical axis 102.

Furthermore, a second lens group 101b and a first lens group 101a of the optical system 100 are movable along the optical axis 102. The first lens group 101a and the second lens group 101b are, in particular, the only lens groups 101 of the at least three lens groups 101 on the optical axis 102, which are movable. In other words, each lens group 101, except the first lens group 101a and the second lens group 101b, is immovable along the optical axis 102. Thereby, the second lens group 101b is movable along the optical axis 102, in order to set a magnification of the optical zoom system 100, and the first lens group 101a is movable along the optical axis 102, in order to focus the optical zoom system. The first lens group 101a and/or the second lens group 101b may be continuously movable along the optical axis 102 over their respective ranges of movement. The movement ranges of the first lens group 101a and the second lens group 101b may be different, in particular the second lens group 101b may have a larger movement range. Additionally or alternatively, the first lens group 101a and the second lens group 101b may be separately and/or independently movable. That is, each of the two lens groups 101a, 101b can be moved while the other is not moved, and can be moved irrespective of the amount of movement of the other one.

In the optical zoom system 100, each of the at least three lens groups 101 may be assigned a separate/dedicated space, which is not used and/or is not usable by any other lens group 101. That is, for example, no lens of one lens group 101 may be arranged within/between lenses of another lens group 101. Moreover, the first lens group 101a and the second lens group 101b, respectively, may not be movable to move into the space occupied by/dedicated to another lens group 101. For instance, the second lens group 101b may be movable between the third lens group 101c and the first lens group 101a, however, it cannot be moved into the spaces assigned to the third lens group 101c and the first lens group 101a, respectively.

Figure 2:
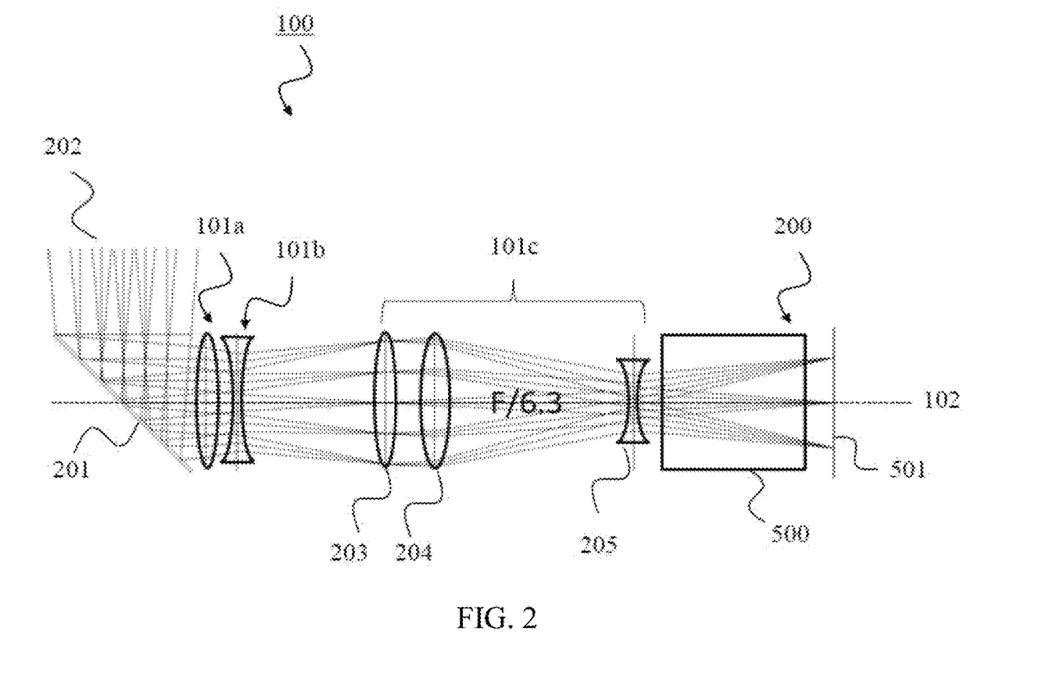
FIG. 2 shows an optical zoom system according to an embodiment of the disclosure.
Figure 6:
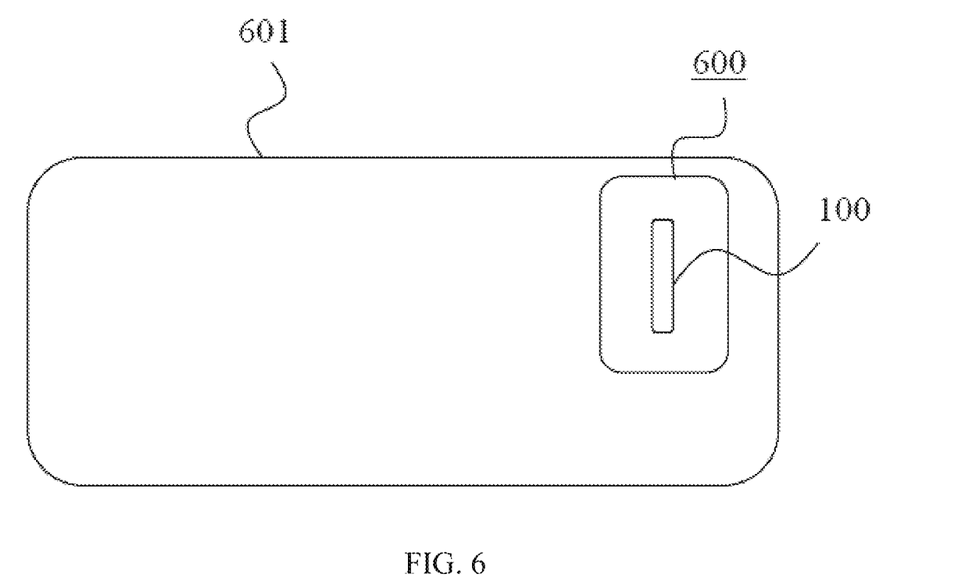
FIG. 6 shows a zoom camera according to an embodiment of the disclosure in a mobile device.

FIG. 2 shows the optical system 100 of FIG. 1 with further optional features. In particular FIG. 2 shows an optical zoom system 100 for a tele-photo miniature zoom camera 600, e.g. as shown in FIG. 6, according to an embodiment of the disclosure. FIG. 2 shows a number of elements of the optical zoom system 100, which may each comprises one or more parts, and may also comprise parts that are not drawn (in order to give a better overview of the optical system 100).

In particular, the optical zoom system 100 shown in FIG. 2 has a light entrance 202, e.g. an aperture, which is followed by a mirror 201, in particular a folding mirror 201. Behind the mirror 201, the first lens group 101a and the second lens group 101b are arranged on the optical axis. Thereby, the first lens group 101a may be arranged before the second lens group 101b (as shown), but also in reverse order. The lens groups 101a and 101b may be followed by the third lens group 101c (as shown), but the order of the three lens groups 101 on the optical axis 102 may also be different.

The at least three lens groups 101 are followed by a detector assembly 200 configured to detect light collected by the optical zoom system 100, and configured to capture one or more images based on the detected light. The detector assembly 200 may include a spectral separator 500, e.g. an x-cube separator 500 (see FIG. 5), and may further comprise a sensor array comprising a plurality of image sensors 501 (see FIG. 5) after the separator 500. For instance, the detector assembly 200 may comprise three image sensors 501. The spectral separator 500 may in this case transfer three defined wavelength regions onto the three image sensors 501, in a way that it splits the incoming electromagnetic field (light, but can also be/include electromagnetic radiation invisible to the human eye, e.g. IR) at certain spectral bands (which may be confined to an implemented glass or plastic lens materials of the optical zoom system 100 and its lateral color aberration). In other words, the spectral separator 500 is configured to separate the light into a plurality of spectral bands. Then, each image sensor 501 may capture an image in one of these spectral bands.

Figure 5:
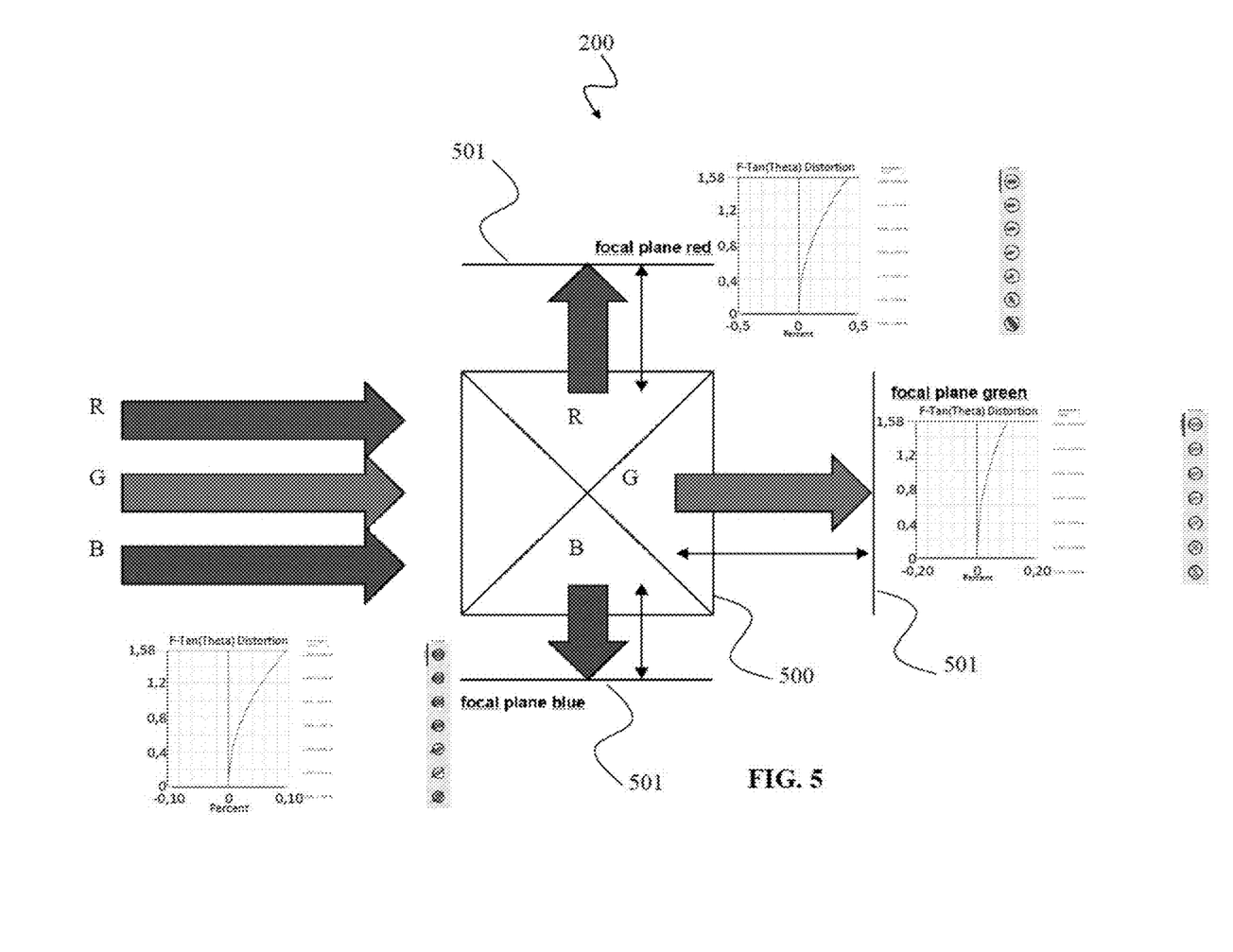
FIG. 5 shows a spectral separator for a zoom camera according to an embodiment of the disclosure.

After the color separation by the separator 500 (e.g. into red (R), green (G), and blue (B)), each image sensor 501 may detect a spectral band of the incoming/collected light. Special attention should be made to the coating of the spectral separator if realized as x-cube separator 500, in order to meet the spectral bands, and in order to achieve an un-polarized performance (meaning not polarization dependent).

The moving (first and second) lens groups 101a and 101b may have different zooming functions. The second lens group 101b may be moveable by a greater amount, and may primarily drive the optical zoom system magnification. The first lens group 101a may be moveable by a smaller amount, and may be used to compensate the optical zoom system 100, in order to achieve a stable focusing/imaging onto the image sensor(s) 501.

The third lens group 101c may comprise at least two subgroups, e.g. a first subgroup 203 and a second subgroup 204. Optionally, it may also comprise a third subgroup 205. The first subgroup 203 and the second subgroup 204 may each have a positive optical power. The third subgroup 204 may have negative optical power. The first subgroup 203 may be arranged and configured such that it collects light from the second lens group 101b. It may further be configured to provide the collected light, in particular parallel light rays, to the second subgroup 204. The second subgroup 204 may be configured to form a real image from the collected light, in particular for being captured by the detector assembly 200. Thereby, light rays associated with a given image point of the real image are substantially parallel between the first subgroup 203 and the second subgroup, i.e. within±4°, or even±2° from a mean direction of the light rays, e.g. along the optical axis 102.

Figure 3:
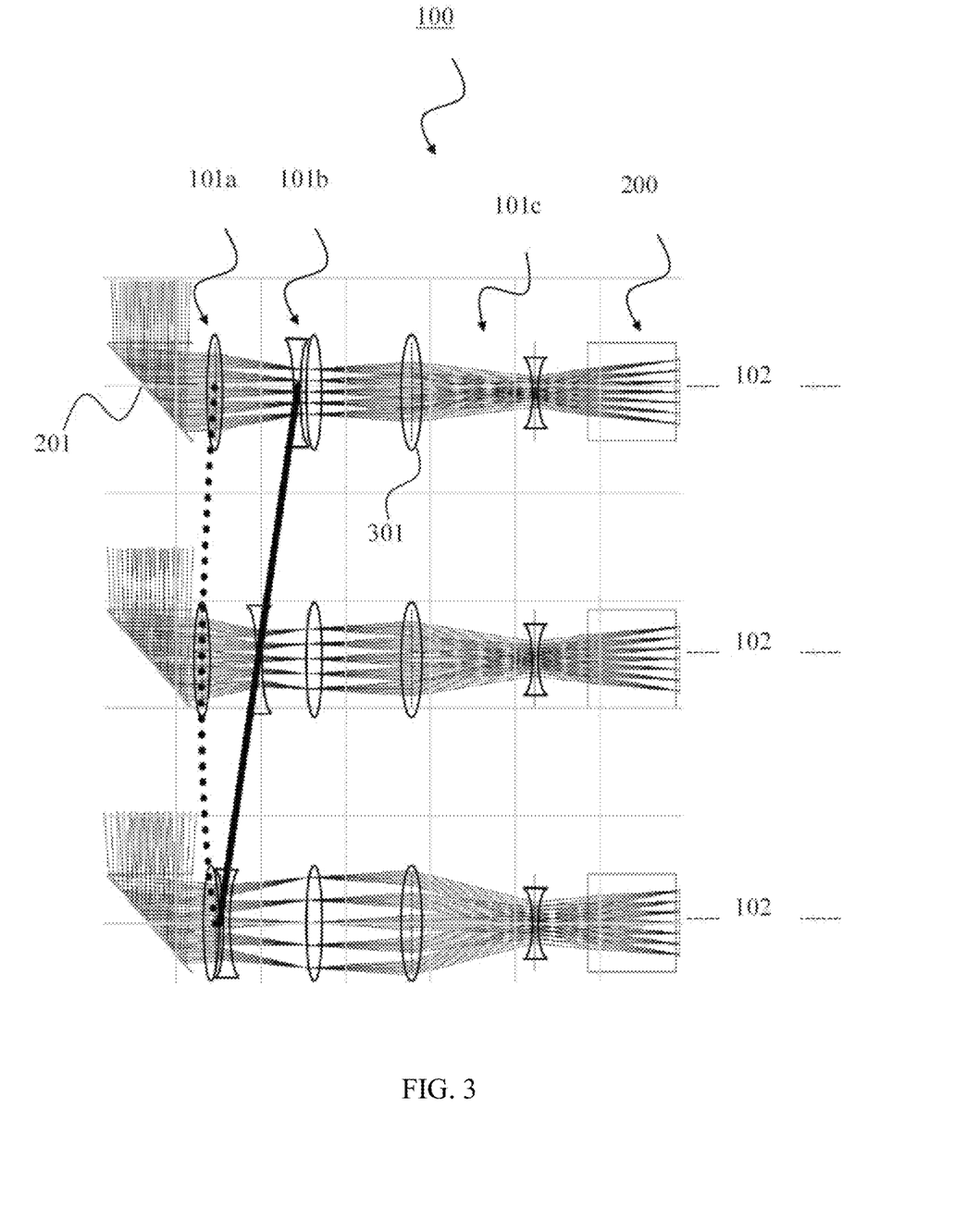
FIG. 3 shows an optical zoom system according to an embodiment of the disclosure.

FIG. 3 shows an optical zoom system 100 as in FIG. 2, but illustrates a movement of the first lens group 101a and the second lens group 101b, respectively. As can be seen, the movement of the two lens groups 101a and 101b may be quite different. The movement curve of the second lens group 101b (solid line) may be rather big, i.e. it may have a large movement range, while the movement curve of the first lens group 101a (dotted line) may be small, i.e. it may move only very little over a small movement range.

In this optical zoom system 100 of FIG. 3, the second lens group 101b has a negative optical power, while the first lens group 101a has a positive optical power. It can be further seen from FIG. 3, that the movement of the second lens group 101b may go completely from the first lens group 101a to the third lens group 101c. The first lens group 101a, to the contrary, moves only very little.

With respect to the mechanical possibilities for moving the different lens groups 101a and 101b, respectively their different movement ranges allow different actuator setups. In particular, a second, e.g. screw, actuator may be provided to move the second lens group 101b. Further, a more precise and/or faster first actuator may move the first lens group 101a, which first actuator could be either a voice coil motor (VCM), or piezo actuator (PA) setup, or a wiggle actuator. The combination of such actuators may ensure the necessary precision and response time to achieve image capturing of the optical zoom camera 600 including the optical zoom system 100, particularly in a modern mobile device.

Due to the special layout of the optical zoom system 100, as shown in FIGS. 1-3, the first lens group 101a may not only have the task to establish a focal imaging onto the image sensor(s) 501, but may also achieves an optimum near-imaging through its motion. Further, due to the fact that it can be fitted with a fast and/or precise actuator, it is also possible to give the first lens group 101a an auto-focus function, for example, within an optical zoom camera 600.

Figure 4:
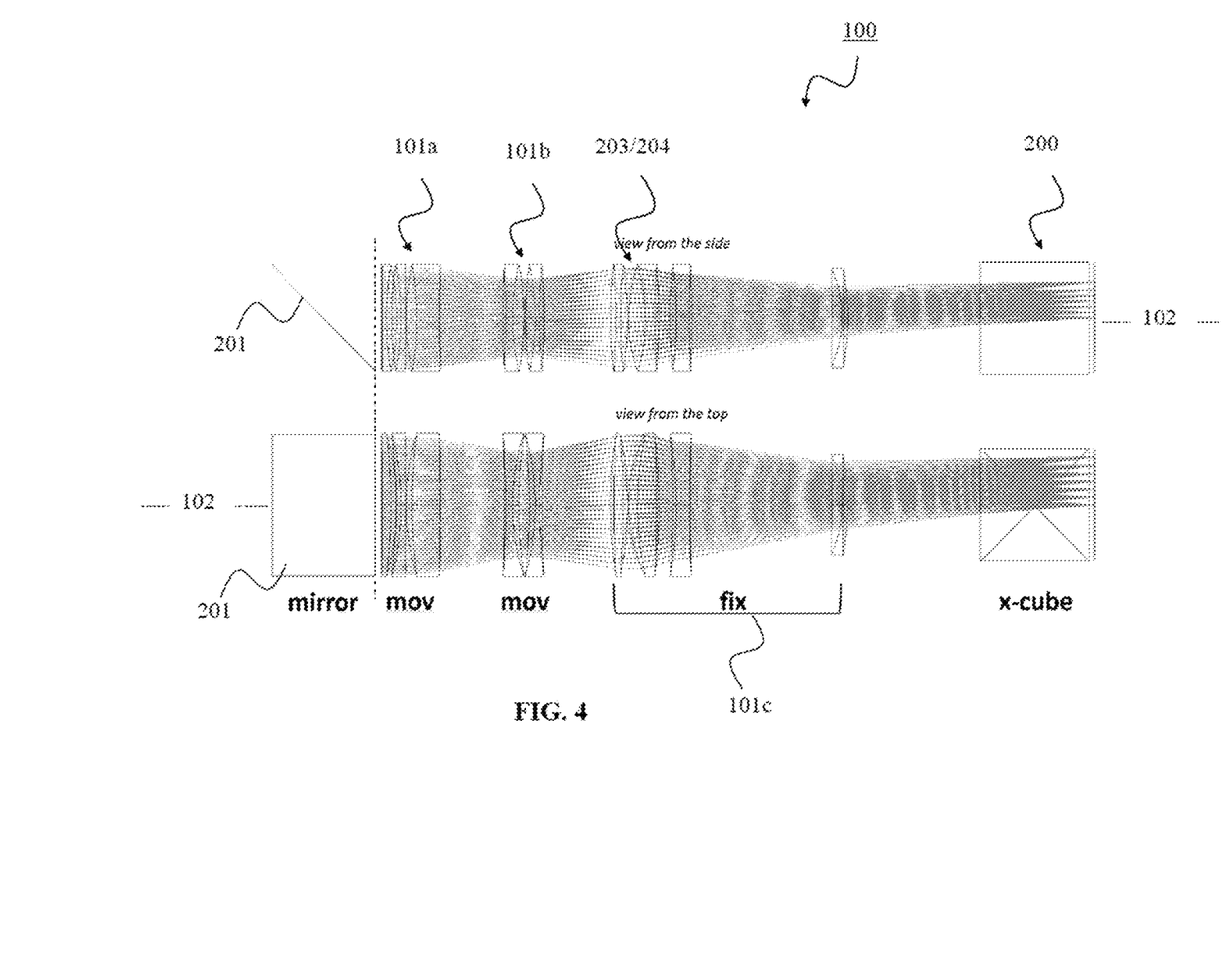
FIG. 4 shows an optical zoom system according to an embodiment of the disclosure.

FIG. 4 shows an even more detailed picture of the optical zoom system 100, in particular, from the side and the top. It can be seen, that the lens groups 101 (movable first lens group 101a/movable second lens group 101b/fixed third lens group 101c) may each include two or more lens elements to for the lens group 101. These lens elements may have an elliptical optical cross section, which enables more light to enter the optical zoom system 100, and therefore decreases the effective F-Number. Alternatively or in combination, the lens elements may have an i-cut cross section, which provides another possibility to decrease the F-Number. Generally, each lens group 101 may comprises one or more lenses having an elliptical cross section or an i-cut cross section.

Due to the desired high magnification, the optical zoom system 100 is more sensitive to an angular tilt of the incoming light or ray field. Therefore, OIS may be done upfront, e.g. using the mirror 201 shown in FIG. 2 as an OIS device. In this case, the mirror 201 may be configured to tilt about two axes. By tilting the mirror 201 in two directions, the incoming light/ray field can be stabilized, and can further be properly redirected (e.g. folded) for propagation through the at least three lens groups 101, and further onto the image sensor(s) 501.

By using, as shown in FIG. 5, a 3-sensor array, i.e. three optical image sensors 501, the zoom camera 600 may be provided with an additional degree of freedom, because the three sensors 501 do not necessarily have to have the same distance from the spectral separator 500 (e.g. x-cube separator). Thus, each image sensor 501, and therefore each spectral band, may have its own optimized working distance behind the spectral separator 500, and therefore behind the fixed third lens group 101c.

FIG. 6 shows a mobile device 601, which includes a zoom camera 600 according to an embodiment of the disclosure. The mobile device 601 may be a mobile phone, particularly a smartphone, but may also be a tablet, laptop, smartwatch or similar device. The zoom camera 600 comprises the optical zoom system 100 described above with respect to FIGS. 1-5, and comprises one or more image sensors 501. Each image sensor 501 may have a sensor surface configured to capture an image based on light collected by the optical zoom system 100. In particular, as shown in FIG. 5, the zoom camera may further comprise the spectral separator 500 wherein the spectral separator 500 and the image sensor(s) 501 form a detector assembly 200 and the spectral separator 500 may be configured to separate light collected by the optical zoom system 100 into a plurality of spectral bands, e.g. into three bands like R, G, and B. Each image sensor 501 may be configured to capture an image in one of the spectral bands.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. An optical zoom system for a mobile device, wherein the optical zoom system comprises:
   a first lens group arranged on an optical axis and configured to move along the optical axis to focus the optical zoom system;
   a second lens group arranged on the optical axis and configured to move along the optical axis to set a magnification of the optical zoom system, wherein the first lens group and the second lens group are independently movable;
   a third lens group arranged on the optical axis and immovable along the optical axis, wherein the first lens group, the second lens group, and the third lens group are spatially separated from each other;

a first actuator configured to move the first lens group; and a second actuator configured to move the second lens group, wherein a first speed of the first actuator is higher than a second speed of the second actuator.

2. The optical zoom system of claim 1, further comprising a fourth lens group that is immovable.

3. The optical zoom system of claim 1, wherein the first lens group and the second lens group are continuously movable along the optical axis.

4. The optical zoom system of claim 1, wherein each of the first lens group, the second lens group, and the third lens group has an assigned separate space in the optical zoom system.

5. The optical zoom system of claim 1, wherein the second lens group and the first lens group are separately movable.

6. The optical zoom system of claim 1, wherein the second lens group is movable between the third lens group and the first lens group.

7. The optical zoom system of claim 1, wherein the first actuator comprises a voice coil actuator, or wherein the second actuator comprises a screw actuator.

8. The optical zoom system of claim 1, wherein each of the first lens group, the second lens group, and the third lens group comprises one or more lenses having an elliptical cross section or an i-cut cross section.

9. The optical zoom system of claim 1, further comprising an optical image stabilization (OIS) system, wherein the OIS system comprises a tiltable mirror.

10. The optical zoom system of claim 1, wherein the first lens group is arranged before the second lens group and the second lens group is arranged before the third lens group with respect to a light collecting direction of the optical zoom system.

11. The optical zoom system of claim 1, wherein the second lens group has a negative optical power, and wherein the first lens group has a positive optical power.

12. The optical zoom system of claim 1, wherein the third lens group comprises:

a first subgroup arranged on the optical axis and configured to collect a light from the second lens group; and a second subgroup arranged on the optical axis and configured to form a real image from the light, wherein each of the first subgroup and the second subgroup has a positive optical power, and wherein light rays associated with one image point of the real image are parallel between the first subgroup and the second subgroup.

13. The optical zoom system of claim 1, wherein the first lens group is continuously movable along the optical axis.

14. The optical zoom system of claim 1, wherein the second lens group is continuously movable along the optical axis.

15. The optical zoom system of claim 1, wherein the first actuator comprises a piezoelectric actuator, or wherein the second actuator comprises a screw actuator.

16. A zoom camera for a mobile device, wherein the zoom camera comprises:

an optical zoom system configured to collect a light and comprising:

a first lens group arranged on an optical axis and configured to move along the optical axis to focus the optical zoom system;

a second lens group arranged on the optical axis and configured to move along the optical axis to set a magnification of the optical zoom system, wherein the first lens group and the second lens group are independently movable;

a third lens group arranged on the optical axis and immovable along the optical axis, wherein the first lens group, the second lens group, and the third lens group are spatially separated from each other;

a first actuator configured to move the first lens group; and a second actuator configured to move the second lens group, wherein a first speed of the first actuator is higher than a second speed of the second actuator; and one or more image sensors coupled to the optical zoom system, wherein each of the one or more image sensors comprises a sensor surface for capturing a first image based on the light.

17. The zoom camera of claim 16, further comprising a spectral separator configured to separate the light into a plurality of spectral bands, wherein each of the one or more image sensors is configured to capture a second image in one of the spectral bands.

18. The zoom camera of claim 16, wherein the zoom camera is configured to move the first lens group in an autofocus mode.

19. The zoom camera of claim 16, wherein the optical zoom system further comprises an optical image stabilization (OIS) system, and wherein the OIS system comprises a tiltable mirror.

20. The zoom camera of claim 16, wherein the first actuator comprises a piezoelectric actuator, or wherein the second actuator comprises a screw actuator.

* * * * *